US011116125B2

(12) United States Patent
Murphy (10) Patent No.: US 11,116,125 B2
(45) Date of Patent: Sep. 14, 2021

(54) GREENHOUSE MOBILE SENSOR VEHICLE (71) Applicant: Steve M. Murphy, Chandler, AZ (US)

(72) Inventor: Steve M. Murphy, Chandler, AZ (US)

( * ) Notice: Subject to any disclaimer, the term of this patent is extended or adjusted under 35 U.S.C. 154(b) by 262 days.

(21) Appl. No.: 16/358,406

(22) Filed: Mar. 19, 2019

(65) Prior Publication Data
US 2019/0289772 A1 Sep. 26, 2019

Related U.S. Application Data (60) Provisional application No. 62/648,062, filed on Mar. 26, 2018.

(51) Int. Cl.
A01B 79/00 (2006.01)
G05D 1/00 (2006.01)

(52) U.S. Cl.
CPC .......... A01B 79/005 (2013.01); G05D 1/0011 (2013.01)

(58) Field of Classification Search
None
See application file for complete search history.

(56) References Cited

U.S. PATENT DOCUMENTS

| 4,755,942 | A * | 7/1988 | Gardner | A01G 25/16 |
| | | | | 700/284 |
| 9,582,002 | B2 * | 2/2017 | Cavender-Bares | A01B 51/02 |
| 2006/0042807 | A1 * | 3/2006 | Erickson | A01B 59/042 |
| | | | | 172/776 |
| 2006/0213167 | A1 * | 9/2006 | Koselka | A01B 79/005 |
| | | | | 56/10.2 A |
| 2008/0017426 | A1 * | 1/2008 | Walters | F41H 7/044 |
| | | | | 180/89.1 |
| 2008/0074254 | A1 * | 3/2008 | Townsend | G01W 1/17 |
| | | | | 340/539.11 |
| 2009/0086470 | A1 * | 4/2009 | Schafer | A01G 9/26 |
| | | | | 362/122 |
| 2011/0022231 | A1 * | 1/2011 | Walker | A01G 3/08 |
| | | | | 700/259 |
| 2014/0012732 | A1 * | 1/2014 | Lindores | G06Q 50/02 |
| | | | | 705/37 |
| 2015/0302305 | A1 * | 10/2015 | Rupp | A01B 79/005 |
| | | | | 706/46 |
| 2017/0032258 | A1 * | 2/2017 | Miresmailli | A01G 13/06 |

(Continued)

FOREIGN PATENT DOCUMENTS

WO 2016025848 2/2016

OTHER PUBLICATIONS

LI-COR Biosciences, Daily Light Integral (DLI) measurement using LI-COR Light Sensors, Jan. 8, 2013, Newsline, pages: all. (Year: 2013).*

Primary Examiner — James J Lee
Assistant Examiner — Tawri M Matsushige
(74) Attorney, Agent, or Firm — Mark V. Loen (57) ABSTRACT An unmanned, autonomous, battery powered and rechargeable vehicle having multiple sensors for collecting, analyzing, storing and transmitting data related to environmental and plant growth data in greenhouse environment. The mobile vehicle navigates between plant rows tracking a designated and repeatable path several times daily, collecting data from the plant root ball up to and including the plant canopy, without touching, sampling, or impacting plant growth. A telescoping arm ensures the sensor platform height is optimized relative to the plant canopy height.

5 Claims, 5 Drawing Sheets (56) References Cited

U.S. PATENT DOCUMENTS

| | | |
|---|---|---|
| 2017/0223947 A1 | 8/2017 | Gall et al. |
| 2018/0081522 A1* | 3/2018 | Greenberg .......... G06F 3/03547 |
| 2020/0033312 A1* | 1/2020 | Overton ............... G06K 9/6201 |
| 2021/0045301 A1* | 2/2021 | Shakoor ............... G05B 19/042 |

* cited by examiner

GREENHOUSE MOBILE SENSOR VEHICLE

CROSS REFERENCE TO RELATED APPLICATIONS

This application claims the benefit of U.S. provisional patent application No. 62/648,062 filed on Mar. 26, 2018. The provisional application is incorporated by reference herein.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION

(1) Field of the Invention

The present invention is in the technical field of mobile sensors for plantae growth environments. In particular, the invention is directed toward mobile sensors, analyzers, and data collection for large rows of agriculture crops at the canopy height.

(2) Description of Related Art

US publication number 20170223947 by Gall, et al. describes a mobile unit that is capable of identifying diseased plants, pests, and overall growth measurements. Unfortunately, the system has limitations because the height of the sensors is fixed. There is no accommodation for measuring crop environment at the canopy height.

Current vegetable, fruit, herb, and nursery production, yield, and quality are suboptimal as a result of insufficient plant growth observation and corresponding input adjustment.

The need for a canopy height environmental survey is important because the vast majority of new plantae stem and leaf growth occurs at the canopy level. The quality and rate of new stem and leaf growth are critical to crop yield, quality, and grower economics.

BRIEF SUMMARY OF THE INVENTION

An unmanned, autonomous, battery powered and rechargeable vehicle having multiple sensors for collecting, analyzing, storing and transmitting data related to environmental and plant growth data in greenhouse, hothouse, or other plant growing facility environment. The mobile vehicle navigates between plant rows tracking a designated and repeatable greenhouse path several times daily, collecting data from the plant canopy, without touching, sampling, or impacting plant growth. A telescoping arm ensures the sensor platform height is optimized relative to the plant canopy height.

DETAILED DESCRIPTION OF THE INVENTION

The embodied invention is an unmanned, autonomous, and rechargeable vehicle having multiple sensors for collecting, analyzing, storing, and transmitting environmental data related to plant growth. A featured embodiment is to collect the plant growth data in a greenhouse, hothouse, or other plant growth-housing environment. The data collecting vehicle navigates between plant rows by tracking a designated and repeatable path several times daily, collecting data from the plant root ball up to and including the plant canopy, without touching, sampling, or impacting plant growth.

The embodied invention aims to provide a solution to the problem of sub optimal plant growth due to insufficient plant growth data and corresponding input or farming practice adjustments.

The invention comprises a vehicle having multiple sensors for collecting, analyzing, storing and transmitting data. The data is collected, sorted, analyzed, and used as inputs to plant growth models to identify changes to achieve optimum farming environments. Increased plant growth data improves management of plant growth deficiencies linked to:

1. irrigation,
2. plant nutrients,
3. lighting,
4. atmospheric composition,
5. disease,
6. pestilence,
7. greenhouse management practices, and
8. other factors critical to plant growth.

The invention relates to a mobile vehicle that is particularly, yet not exclusively, suitable for deployment in a greenhouse, hothouse, or other plant growing facility (i.e. greenhouse) in order to carry out inspection, monitoring, data capture, data analytics, and two-way data transmission on a predetermined and recurring schedule.

The mobile vehicle assembly includes a motor, motor controls, a drive system, a navigation system, and a power system to repeatedly travel along a designated path in the greenhouse, at scheduled frequencies, in an unmanned and autonomous mode.

The mobile vehicle is battery powered and includes a battery system that is rechargeable by way of a stationary recharging station. The mobile vehicle commences and ends at the charging station for each recurring navigation path. The mobile vehicle includes the electricity storage system, power control systems, and inverter systems necessary to provide quality power to all onboard electronic components, including but not limited to, sensors, imaging systems, central processing units, data loggers, control systems, motors, and drives.

Figure 1:
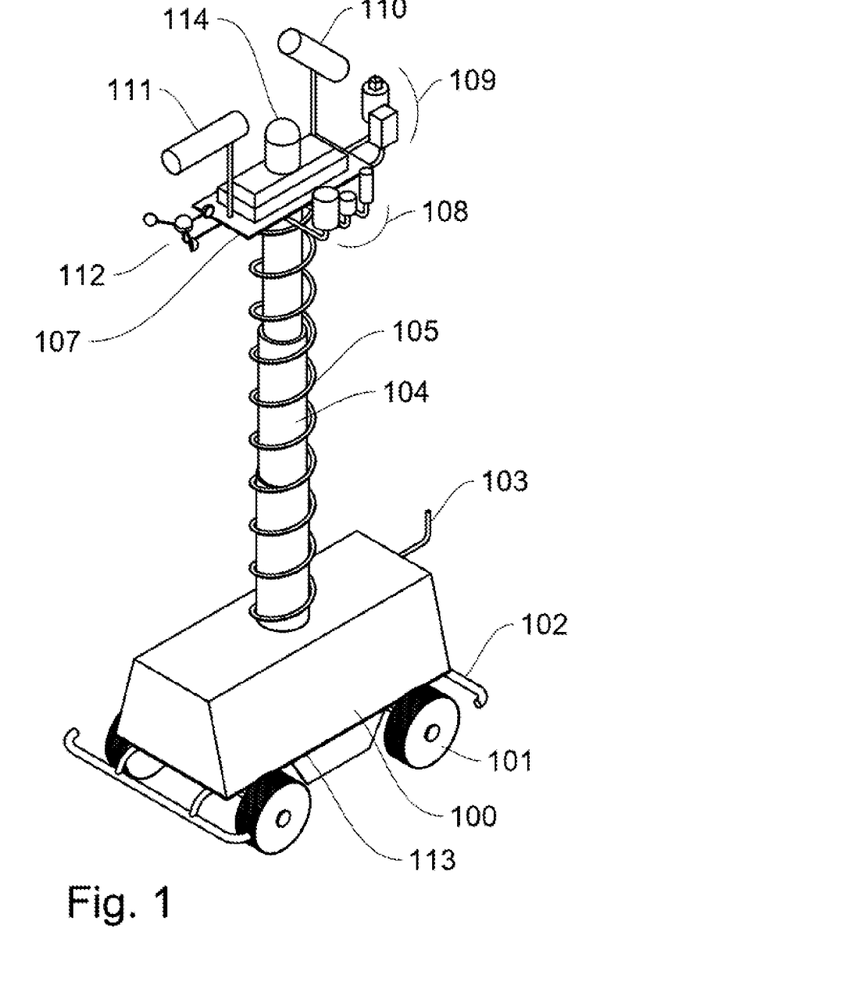
FIG. 1 shows a perspective view of the greenhouse mobile sensor vehicle assembly.

As seen in FIG. 1, the mobile vehicle includes an enclosure 100 mounted on a base frame 113 designed to provide protection for the various features of the data collecting vehicle.

The mobile vehicle incudes a drive train, environment sensors 108,109, wheels 101, axle system, wheel steering system, motor drive system, telescoping arm motor(s), navigation system, power control system, battery, central processing units, data logger, antenna, and wireless communications system. The sensor platform 107 preferably includes a status light indicator 114.

The mobile vehicle includes a wheel and drive/axle system to support horizontal movement and is integrated with the navigation system to follow a designated path in a greenhouse. Wheel and drive/axle systems include, but not necessarily limited to, tire systems, continuous track systems, flat rail systems, or tube rail systems. Alternately, the drive/axle system includes, but not necessarily limited to, 4 wheel drive (4WD), all-wheel drive (AWD), and 2 wheel drive systems (2WD).

A rigid guard or bumper 102 connected to the vehicle frame protects the vehicle.

The mobile vehicle includes a wireless systems antenna that communicates with any of
1. communication or internet gateways
2. remote databases,
3. charging stations,
4. stationary greenhouse sensors, and
5. other mobile vehicles and their components.

The wireless communications system technology may include, but not necessarily limited to, radio frequency identification (RFID), Bluetooth, WIFI, laser, light, or radio frequencies. The antenna 103 preferably protrudes from the mobile unit housing for reliable two way communications.

Data to be transmitted includes environmental and plant growth data, from environment sensors including, but not necessarily limited to:
1. wet bulb atmospheric temperature,
2. dry bulb atmospheric temperature,
3. relative humidity,
4. barometric pressure,
5. carbon dioxide ($CO_2$) concentration,
6. wind speed 112, wind direction,
7. telescoping arm position,
8. infrared radiation surface temperature,
9. ultraviolet (UV) radiation,
10. photosynthetically active radiation (PAR),
11. daily light integral (DLI),
12. infrared imagery,
13. visible light imagery, and
14. multi or hyper spectral imagery.

The mobile vehicle operating system also monitors and records vehicle speed, vehicle direction, vehicle position, vehicle status, and vehicle operational data.

The mobile vehicle includes a portfolio of predetermined sensors, mounted on the sensor platform or sensor platform appendages, to measure, collect, record, calibrate, and transfer data related to environmental conditions, plant growth data, mobile vehicle status, and mobile vehicle navigation data. Sensors may be arranged to collect data from all x-y-z array combinations relative to the sensor platform. The sensors include imaging cameras 110,111 that monitor visible, infrared, or ultraviolet light.

The mobile vehicle includes a telescoping arm 104, the base of which is attached to the mobile unit base frame 113. The telescoping arm is actuated, that is, extends or retracts in the vertical direction, by a motor and motor controls located within the mobile unit housing. The telescoping arm supports the sensor platform 107 and all wiring necessary to support the sensors 108,109,112 attached to the sensor platform.

The telescoping arm is actuated to an optimized height that ensures the sensor platform level is substantially at the plant canopy height. The telescoping arm height target determination methodology may include, but not necessarily be limited to, manual setting, algorithmic calculation, imagery or vision guidance, laser target navigation, radar, quick response code (QR), or a combination. The telescoping arm may include stabilizing structures to reduce sensor platform sway and vibration at extended heights. Telescoping arm positioning technologies include, but not necessarily limited to, hydraulic lifts, gas pressure lifts, scissor lifts, motor and chain systems, screw lifts, electromechanical lifts, and other mechanical systems.

The mobile vehicle includes a wiring harness 105 to facilitate power flow and data flow between the components in the mobile unit housing and the components on the sensor platform. The wiring harness may or may not be wrapped around the telescoping arm as illustrated.

Figure 2:
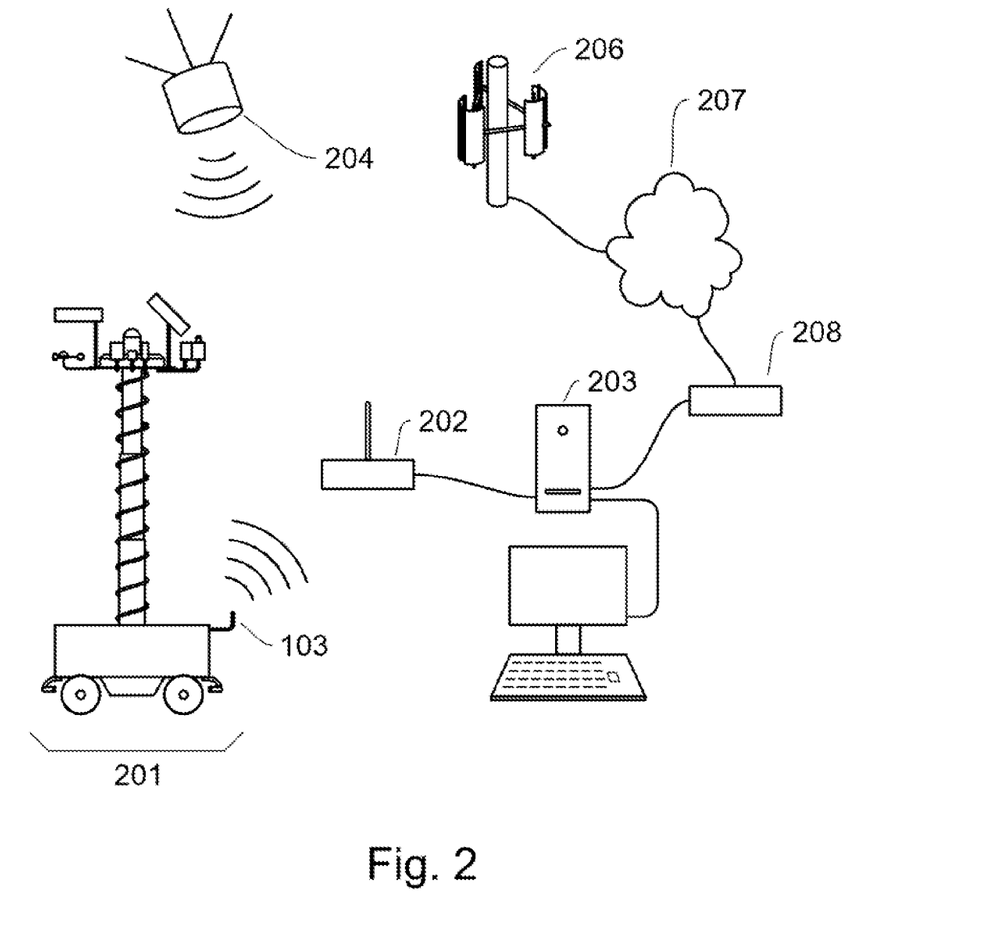
FIG. 2 shows a view of communications between the mobile sensor assembly and a remote computer.

FIG. 2 illustrates how the mobile sensor unit 201 receives positioning data from a satellite 204 ground positioning system (GPS) and communicates to a local wireless receiver 202 (or alternately cell phone tower 206—internet 207—modem 208) that connects with a remote computer system 203 for the transfer of data. The remote computer system may be located in the cloud or internet, which means the remote computer may be a computer or server owned by a third party.

Figure 3A:
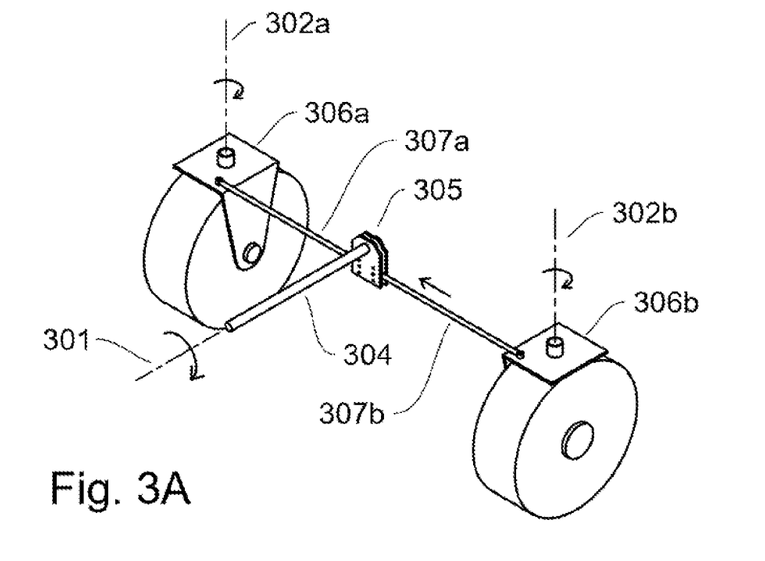
FIGS. 3A-3B show simplified steering and drive equipment for the mobile sensor assembly.
Figure 3B:
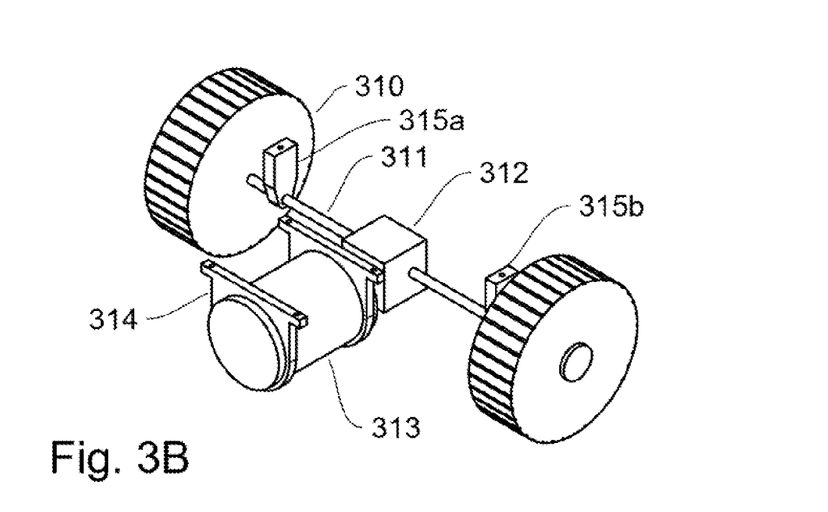

FIGS. 3A-3B show a simplified wheel steering system and drive equipment for the mobile sensor assembly. In FIG. 3A, the drive train comprises a turning shaft 304 which makes the wheels turn left or right. It rotates about a turning axis 301 and the arrows indicate the motion of the shaft and wheel linkage 307a,b to make a right turn. The wheels are mounted on a wheel mounting bracket 306a,b and rotate about a vertical wheel axis 302a,b respectively. The turning shaft is rigidly connected to a connecting bracket 305 which allows the wheel linkage ends to rotate at a connecting pin. The turning axis, and wheel vertical axis are rigidly positioned with respect to a drive assembly mounting plate.

In FIG. 3B, two wheels 310 on a common axle shaft 311 are connected to a gear box 312 that is connected to a motor 313. The motor is mounted on a base plate (not shown) by a mounting element 314. The axle shaft 311 is also mounted to the base plate by a support housing-bearing 315a,b, pillow block bearings, or similarly housed bearing. An electrical drive motor controller drives the motor speed to control the speed of the mobile sensor vehicle.

Figure 4:
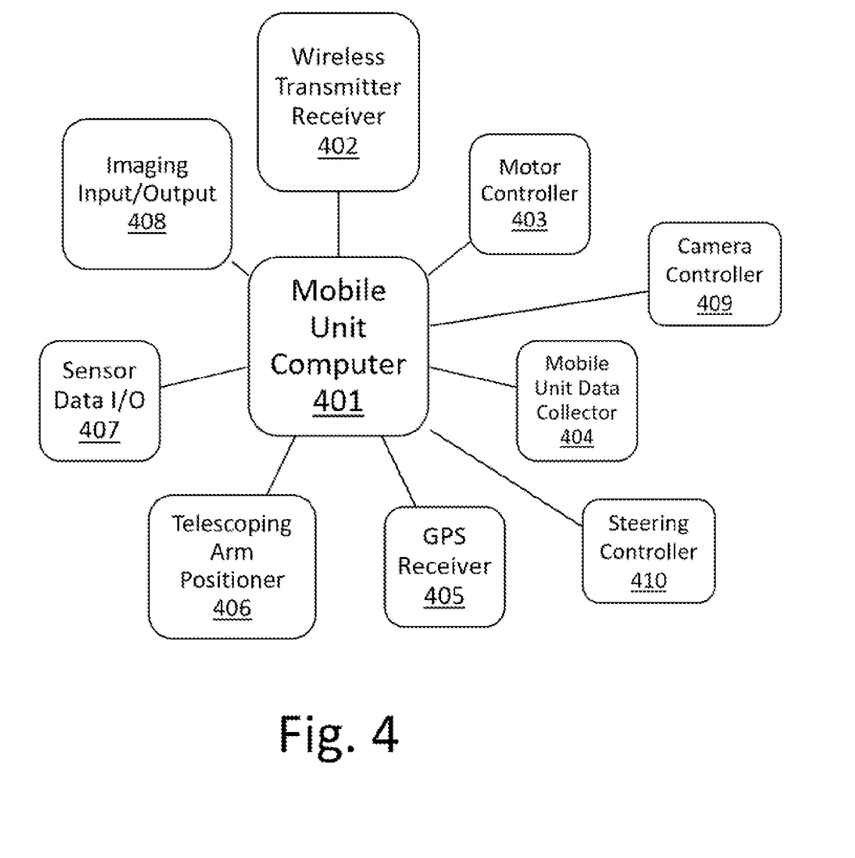
FIG. 4 shows the control modules on the mobile sensor vehicle

In FIG. 4, a Mobile Unit Computer 401 is connected to:
1. Wireless Transmitter Receiver 402 connected so as to allow communication to the main computer and database
2. Motor Controller 403 connected to the drive motor to move the unit. Also, the motor controller controls the steering base on GPS data.
3. Mobile Unit Data Collector 404 is data collected from the mobile unit controls as to position, time, and status of any operating system.
4. GPS Receiver 405 receives signals from satellites to determine the position of the mobile unit
5. Telescoping arm positioner 406 to extend/retract arm keep the sensors at the canopy height.
6. Sensor data inputs/outputs 407 to obtain the sensor readings whether analog or digital.
7. Imaging input/outputs 408 to the vehicle computer for any camera on the sensor platform.
8. Camera controller 409 to position any of the image cameras.

9. Steering controller 410 to move the steering wheels according to the predetermined path for monitoring the plant environment data.

Figure 5:
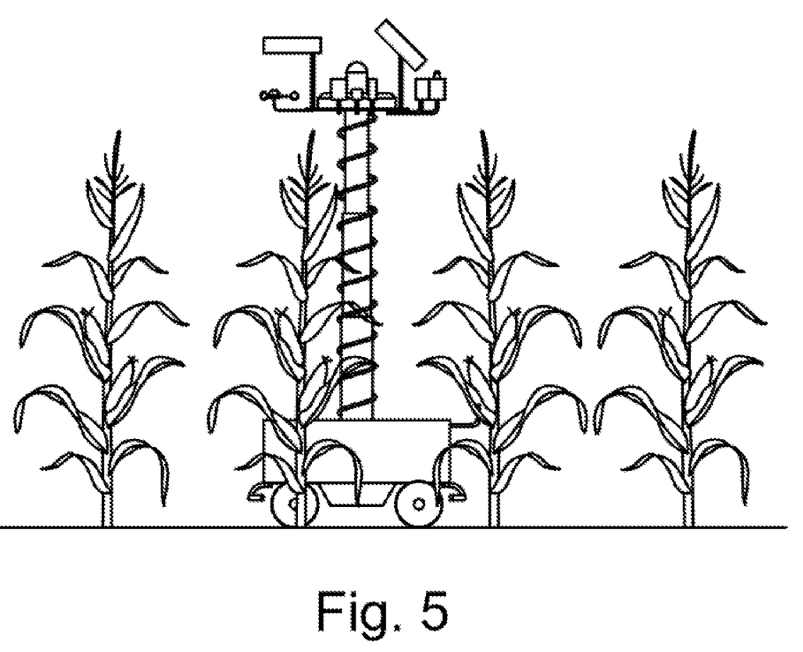
FIG. 5 shows how the mobile sensor vehicle collects data at the canopy level.

In FIG. 5, the mobile unit is surveying crops (such as illustrated corn) at the canopy height where the mobile sensor platform is at an elevation substantially at the top of the plants.

The mobile vehicle computer includes navigation technology that enables the vehicle to depart the energy charging station, navigate a predetermined route for the beginning and end of each crop row, collect data, and return to the energy charging station. Navigation technology includes, but not necessarily limited to, laser target navigation, radar, quick response code (QR), global positioning systems (GPS), electromechanical systems (EMS) guided by wire or tape, visual guidance, or in combination.

The mobile vehicle computer includes one or more data loggers to record and collect sensor data in relation to time and location. Data loggers are preferably located under the mobile vehicle housing. Data loggers can be as simple as a single board computer with an adequate hard drive storage system. A single-board computer is known in the art, and is a complete computer built on a single circuit board, with a microprocessor, memory, input and output pins and is programmable to receive input data and output it to another computer by digital communications.

The mobile vehicle includes at least one central processing units to support data analysis and machine learning. Central processing units are preferably located under the mobile vehicle housing.

The mobile vehicle computer is preferably programmed to navigate a repeatable, predetermined path through a greenhouse at more than one starting time throughout each calendar day. A preferred path includes disengagement from the charging station, navigation to a starting crop row, navigation through all crop rows (or between plant rows), completion of the final crop row, return to the charging station, and docking at the charging station.

Preferably, the mobile vehicle remains docked at the charging station when not actively engaged in a greenhouse data collection round. Two way communications may allow remote adjustment to mobile vehicle starting time, path definition, and charging time.

As used herein the terms computer and computer system are intended to refer to a computer-related entity, comprising either hardware, a combination of hardware and software, software, or software in execution capable of performing the embodiments described. The disclosed embodiments which use the central computer refer to being interfaced to and controlled by a computer readable storage medium having stored thereon a computer program. The computer readable storage medium may include a plurality of components such as one or more of electronic components, hardware components, control modules, and computer software components. These components may include one or more computer readable storage media that generally store instructions such as software, firmware and assembly language for performing one or more portions of one or more implementations or embodiments of an algorithm as discussed herein. These computer readable storage media are generally non-transitory and/or tangible. Examples of such a computer readable storage medium include a recordable data storage medium of a computer and storage device. The computer readable storage media may employ, for example, one or more of a magnetic, electrical, optical, biological, and atomic data storage medium. Further, such media may take the form of, for example, floppy disks, magnetic tapes, CD-ROMs, DVD-ROMs, hard disk drives, and solid-state or electronic memory. Other forms of non-transitory and tangible computer readable storage media not list may be employed with the disclosed embodiments.

A number of such components can be combined or divided in an implementation of a computer system. Further, such components may include a set or series of computer instructions written in or implemented with any of a number of programming languages, as will be appreciated by those skilled in the art. Computer instructions are executed by at least one central processing unit. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

I claim:

1. A mobile environment sensor vehicle comprising:
   a base frame,
   a drive train and wheel steering system attached to said base frame,
   a vertical telescoping arm attached to said base frame,
   a battery and a motor drive attached to said base frame,
   a vehicle computer having an operating system,
   a plurality of environment sensors mounted on a sensor platform positioned at the distal end of said vertical telescoping arm,
   at least one image camera mounted on said sensor platform,
   a telescoping arm positioner operable to vertically extend and retract said vertical telescoping arm to position said sensor platform to automatically collect data of an environment proximate to at least one plant from a height of root ball of the plant up to a canopy height using said plurality of environment sensors, and to continuously maintain said sensor platform positioned at said canopy height, and
   said vehicle computer with said operating system further comprising:
      a drive motor controller,
      a plurality of sensor data inputs,
      a telescoping arm positioner,
      a GPS receiver,
      a wireless transmitter, and
      a steering controller,
   said environmental sensors further comprising at least one of each of:
      a dry bulb atmospheric temperature sensor,
      a relative humidity sensor,
      a barometric pressure sensor,
      a carbon dioxide ($CO_2$) concentration sensor,
      a wind speed and direction sensor,
      a telescoping arm position sensor,
      an infrared radiation surface temperature sensor,
      an ultraviolet radiation sensor,
      a photosynthetically active radiation sensor,
      a daily light integral sensor,
      an infrared imagery sensor,
      a visible light imagery sensor, and
      a spectral imagery sensor.

2. The mobile environment sensor vehicle according to claim 1, wherein said mobile environment sensor vehicle is located inside a greenhouse.

3. The mobile environment sensor vehicle according to claim 1, wherein a front bumper and a back bumper are mounted on said base frame.

4. A method for collecting mobile crop environment sensor readings comprising:
   providing a mobile unit further comprising:
   a base frame,
   a drive train and wheel steering train attached to said base frame,
   a vertical telescoping arm attached to said base frame,
   a battery and a motor drive attached to said base frame,
   a vehicle computer having an operating system,
   a plurality of environment sensors mounted on a sensor platform positioned at the distal end of said vertical telescoping arm,
   at least one image camera mounted on said sensor platform,
   a telescoping arm positioner operable to vertically extend and retract said vertical telescoping arm to position said sensor platform to automatically collect data of an environment proximate to at least one plant from a height of root ball of the plant up to a canopy height using said plurality of environment sensors, and to continuously maintain said sensor platform positioned at said canopy height, and
   said vehicle computer with said operating system further comprising:
      a drive motor controller,
      a plurality of sensor data inputs,
      a telescoping arm positioner,
      a GPS receiver,
      a wireless transmitter, and
      a steering controller,
   said environmental sensors further comprising at least one of each of:
      a dry bulb atmospheric temperature sensor,
      a relative humidity sensor,
      a barometric pressure sensor,
      a carbon dioxide (CO2) concentration sensor,
      a wind speed and direction sensor,
      a telescoping arm position sensor,
      an infrared radiation surface temperature sensor,
      an ultraviolet radiation sensor,
      a photosynthetically active radiation sensor,
      a daily light integral sensor,
      an infrared imagery sensor,
      a visible light imagery sensor, and
      a spectral imagery sensor
   positioning said mobile unit at a charging station,
   configuring said operating system to move said mobile unit in a predetermined sequence to:
      leave said charging system,
      position at a start of at least one crop row,
      move to an end of said at least one crop row, and
      return to said charging system
   transmit said data to a remote computer.

5. The mobile environment sensor vehicle according to claim 4, wherein a front bumper and a back bumper are mounted on said base frame.

* * * * *